US005895793A

United States Patent [19]

Kitamura et al.

[11] Patent Number: 5,895,793
[45] Date of Patent: Apr. 20, 1999

[54] FLUORINE-CONTAINING HYDROCARBON COMPOSITION

[75] Inventors: Kenrou Kitamura; Keiichi Ohnishi, both of Yokohama; Masato Fukushima, Ichihara, all of Japan

[73] Assignee: Asahi Glass Company Ltd., Tokyo, Japan

[21] Appl. No.: 09/075,520

[22] Filed: May 11, 1998

Related U.S. Application Data

[62] Division of application No. 08/925,145, Sep. 8, 1997.

[30] Foreign Application Priority Data

Sep. 9, 1996 [JP] Japan ................................ 8-238041
Sep. 10, 1996 [JP] Japan ................................ 8-239569

[51] Int. Cl.$^6$ ........................ C09K 3/00; C08J 9/12
[52] U.S. Cl. ...................... 252/350; 252/67; 510/412; 521/131; 521/98
[58] Field of Search .................... 252/350, 67; 510/412; 521/131

[56] References Cited

U.S. PATENT DOCUMENTS

| | | |
|---|---|---|
| 5,562,857 | 10/1996 | Werner et al. . |
| 5,565,497 | 10/1996 | Godbey et al. . |
| 5,648,019 | 7/1997 | White, III et al. . |
| 5,677,358 | 10/1997 | Lund et al. . |
| 5,716,541 | 2/1998 | Werner et al. ................ 252/67 |

FOREIGN PATENT DOCUMENTS

| | | |
|---|---|---|
| 0 381 986 A1 | 8/1990 | European Pat. Off. . |
| 381986 | 8/1990 | European Pat. Off. . |
| 0 405 615 A2 | 1/1991 | European Pat. Off. . |
| 405615 | 1/1991 | European Pat. Off. . |

*Primary Examiner*—Morton Foelak
*Attorney, Agent, or Firm*—Oblon, Spivak, McClelland, Maier & Neustadt, P.C.

[57] ABSTRACT

A fluorine-containing hydrocarbon composition comprising the following (1) and (2), wherein the proportions of (1) and (2) in the composition are such that (1) is 100 parts by weight, and (2) is from 0.001 to 10 parts by weight:

(1) at least one pentafluoropropane selected from 1,1,1,3,3-pentafluoropropane and 1,1,2,2,3-pentafluoropropane, (2) the following (i) or (ii):
  (i) a combination of (a) and at least one member selected from the following (b) to (e):
    (a) a compound having —$NO_2$,
    (b) a compound having —CN,
    (c) a compound having —$CONR^1R^2$ wherein each of $R^1$ and $R^2$ which are independent of each other, is a hydrogen atom or an alkyl group,
    (d) a lactone,
    (e) a quinone,
  (ii) at least one member selected from the following (f) and (g):
    (f) a reaction product of a compound having a halogen atom and an epoxy group with an active hydrogen compound,
    (g) a reaction product of a compound having a halogen atom and a hydroxyl group with an isocyanate compound.

18 Claims, No Drawings

FLUORINE-CONTAINING HYDROCARBON COMPOSITION

This application is a Division of application Ser. No. 08/925,145, filed on Sep. 8, 1997.

The present invention relates to a fluorine-containing hydrocarbon composition containing "at least one pentafluoropropane selected from 1,1,1,3,3-pentafluoropropane (R245fa) and 1,1,2,2,3-pentafluoropropane (R245ca)" (hereinafter sometimes referred to simply as a pentafluoropropane).

Heretofore, 1,1-dichloro-1-fluoroethane (R141b) or 1,1,1-trifluoro-2,2,-dichloroethane (R123) has been used as a substitute for trichlorofluoromethane (R11), for e.g. a blowing agent for preparation of a polyurethane foam (a polyurethane blowing agent), a refrigerant for a centrifugal chiller or a solvent for cleaning.

However, it has already been decided by Montreal protocol that a hydrochlorofluorocarbon such as R141b or R123 will be totally banned in the year 2020, since its adverse effect to the ozone layer is not zero although it is small as compared with a chlorofluorocarbon such as R11. Accordingly, it is of urgent necessity to develop a substitute material. As a substitute material for R141b or R123, R245fa or R245ca which is a hydrofluorocarbon, is considered to be a prospective candidate compound.

R245fa or R245ca is excellent in stability. However, when various compounds are coexistent, or when it is contacted with equipment materials, its stability tends to deteriorate, and various decomposition products are likely to be formed.

For example, in its application as a solvent, an alcohol is usually added to increase the dissolving power, and at the same time, it will be contacted with the cleaning machine or with the material to be cleaned, and a stain component such as oil, or moisture will be included. Further, in its application as a propellant, an alcohol will be added for the purpose of dissolving a water-soluble effective component, and at the same time, it will be contacted with the container material. In its application as a polyurethane blowing agent, a polyol as a starting material for polyurethane, a catalyst, a foam stabilizer, etc. will be coexistent, and it will be contacted with a blowing machine. Further, when it is used as a refrigerant for e.g. a centrifugal chiller, it will be contacted with the material constituting the chiller or with a lubricant oil.

When decomposition of a pentafluoropropane occurs, for example, in a case of an aerosol product, there will be problem such as an odor or coloring of the liquid due to an oxidized product of the alcohol, or corrosion of the container due to a hydrogen halide formed as a decomposition product.

Further, in polyurethane foaming, there will be a problem such as a decrease in the foaming degree due to deactivation of the catalyst, an increase of the viscosity of the polyol starting material, or yellowing of the product. In the case of a chiller, there will be a problem such as corrosion of the machine due to a hydrogen halide formed as a decomposition product, or a machine trouble due to deterioration of the lubricant oil.

JP-A-5-239251 discloses a nitro compound, a benzophenone, or the like as a stabilizer for a R245fa blowing agent. However, the stabilizer disclosed in this publication does not necessarily provide an adequate stabilizing effect.

It is an object of the present invention to provide a composition which is capable of effectively stabilizing a pentafluoropropane, particularly capable of effectively controlling formation of decomposition products of a pentafluoropropane, such as 1,3,3,3-tetrafluoropropene (R1234ze), 1,2,3,3-tetrafluoropropene (R1234ye), 1,1,1,3-tetrafluoropropane (R254fb) and 1,2,2,3-tetrafluoropropane (R254ca).

The present invention provides a fluorine-containing hydrocarbon composition comprising the following (1) and (2), wherein the proportions of (1) and (2) in the composition are such that (1) is 100 parts by weight, and (2) is from 0.001 to 10 parts by weight:

(1) at least one pentafluoropropane selected from 1,1,1,3,3-pentafluoropropane and 1,1,2,2,3-pentafluoropropane, (2) the following (i) or (ii):

(i) a combination of (a) and at least one member selected from the following (b) to (e);

(a) a compound having —$NO_2$, (b) a compound having —CN, (c) a compound having —$CONR^1R^2$ wherein each of $R^1$ and $R^2$ which are independent of each other, is a hydrogen atom or an alkyl group, (d) a lactone, (e) a quinone, (ii) at least one member selected from the following (f) and (g):

(f) a reaction product of a compound having a halogen atom and an epoxy group with an active hydrogen compound, (g) a reaction product of a compound having a halogen atom and a hydroxyl group with an isocyanate compound.

Now, the present invention will be described in detail with reference to the preferred embodiments.

According to the composition of the present invention, the pentafluoropropane can be stabilized by incorporating the specific compound. Particularly, it is possible to suppress formation of its decomposition products such as R1234ze, R1234ye, R254fb and R254ca. R1234ze and R254fb are decomposition products of R245fa. R1234ye and R254ca are decomposition products of R245ca.

(a) may, for example, be a nitroalkane such as nitromethane or nitroethane, or an aromatic nitro compound such as nitrobenzene, p-nitrotoluene, 2,4-dinitrobenzene, 3,4-dinitrobenzene, 1,3-dinitrotoluene or 1,2-dinitrotoluene.

(b) may, for example, be an aliphatic nitrile such as acetonitrile, or an aromatic nitrile such as benzonitrile, p-methylbenzonitrile or m-methylbenzonitrile.

(c) may, for example, be a formamide such as N,N-dimethylformamide or N,N-diethylformamide, or an acetamide such as N,N-dimethylacetamide, N,N-diethylacetamide or N-methylacetanilide. The carbon number of the alkyl group $R^1$ or $R^2$ is preferably from 1 to 5.

(d) may, for example, be a β-lactone, a γ-lactone or a δ-lactone. Preferred is β-propiolactone, β,β-dimethyl-β-propiolactone, γ-butyrolactone, γ-valerolactone, γ-caprylolactone, γ-crotolactone, δ-valerolactone or δ-caprolactone.

(e) may, for example, be p-benzoquinone, o-benzoquinone, 9,10-anthraquinone or 1,4-naphthoquinone.

In (f), the compound having a halogen atom and an epoxy group, may, for example, be an aliphatic hydrocarbon having a halogen atom and an epoxy group, an alicyclic hydrocarbon having a halogen atom and an epoxy group, or an aromatic hydrocarbon having a halogen atom and an epoxy group. Preferred is an aliphatic hydrocarbon having a halogen atom and an epoxy group. Epichlorohydrin (EPCH) is particularly preferred as the aliphatic hydrocarbon having a halogen atom and an epoxy group.

In (f), the halogen atom is preferably one selected from a chlorine atom, a bromine atom and an iodine atom. Particularly preferred is a chlorine atom. A plurality of halogen atoms are preferably ones selected from chlorine atoms, bromine atoms and iodine atoms. Particularly preferred are a plurality of halogen atoms consisting solely of chlorine atoms.

In (f), the active hydrogen compound is a compound having at least one active hydrogen-containing group selected from e.g. an alcoholic hydroxyl group, a phenolic hydroxyl group, a primary amino group, a secondary amino group and a carboxyl group.

The active hydrogen compound may have two or more active hydrogen-containing groups. Further, the active hydrogen compound may have one active hydrogen-containing group, but is preferably a compound having two or more active hydrogen-containing groups.

The active hydrogen compound may, preferably, be a monool, a polyol, an alkanolamine or a phenol.

The monool may, for example, be a monool such as methanol, ethanol, propanol or butanol. The polyol may, for example, be a polyol such as glycerol, sucrose, ethylene glycol, propylene glycol, trimethylolpropane, pentaerythritol, dextrose, methylglycoside or sorbitol.

The alkanolamine may, for example, be ethanolamine or diethanolamine (DEAM).

The phenol may have various substituents such as an alkyl group, an alkenyl group, an alkoxy group, a carboxyl group and a carbonyl group, in addition to the hydroxyl group.

The phenol may, for example, be a monophenol such as 2,6-di-t-butyl-p-cresol, o-cresol, m-cresol, p-cresol, thymol, p-t-butylphenol, o-methoxyphenol, m-methoxyphenol, p-methoxyphenol, eugenol, isoeugenol, butylhydroxyanisole, phenol or xylenol, or a polyphenol such as bisphenol A, bisphenol F, t-butylcatechol, 2,5-di-t-amylhydroquinone, 2,5-di-t-butylhydroquinone, m-pyrocatechol, 4-chlorocatechol, 4-bromocatechol, 3,4-dihydroxytoluene, 3,4-dioxybenzophenone, 3,4-dioxyacetophenone, p-t-butylpyrocatechol, pyrogallol, resol (a derivative of phenol) or benzilic type polyol (a derivative of phenol).

Further, a polyol having an alkylene oxide such as ethylene oxide (EO) or propylene oxide (PO) added to the above active hydrogen compound, or an active hydrogen compound such as a hydroxyl-terminated prepolymer having an isocyanate reacted in an amount of at most the equivalent amount to such a polyol, is also preferred.

(f) is preferably a halogen-containing polyether polyol. The halogen-containing polyether polyol is preferably an aliphatic hydrocarbon having a halogen atom and an epoxy group, particularly a reaction product of epichlorohydrin with an active hydrogen compound. The halogen of the halogen-containing polyether polyol is preferably contained in the form of a halogenated alkyl group.

In (g), the compound having a halogen atom and a hydroxyl group may, for example, be an aliphatic hydrocarbon having a halogen atom and a hydroxyl group, an alicyclic hydrocarbon having a halogen atom and a hydroxyl group, or an aromatic hydrocarbon having a halogen atom and a hydroxyl group. Preferred is an aliphatic hydrocarbon having a halogen atom and a hydroxyl group, such as ethylene chlorohydrin, α-propylene chlorohydrin, β-propylene chlorohydrin, trimethylene chlorohydrin, tetramethylene chlorohydrin, glycerol-α-monochlorohydrin, glycerol-β-monochlorohydrin, glycerol-α,β-dichlorohydrin or glycerol-α,γ-dichlorohydrin.

In (g), the halogen atom is preferably selected from a chlorine atom, a bromine atom and an iodine atom. Particularly preferred is a chlorine atom. A plurality of halogen atoms are preferably ones selected from chlorine atoms, bromine atoms and iodine atoms. Particularly preferred are a plurality of halogen atoms consisting solely of chlorine atoms. As an example wherein the halogen atom is a bromine atom, propylene bromohydrin (PBH) may, for example, be mentioned.

As the compound having a halogen atom and a hydroxyl group, a reaction product of the above-mentioned compound having a halogen atom and an epoxy group in (f) with an active hydrogen compound, is also preferred. Particularly preferred is a halogen-containing polyether polyol obtained by reacting an aliphatic hydrocarbon having a halogen atom and an epoxy group, such as epichlorohydrin, to an active hydrogen compound as an initiator.

(g) is a compound having a urethane bond which is obtainable by reacting a hydroxyl group in a compound having a hydrogen atom and a hydroxyl group with an isocyanate group in an isocyanate compound. This reaction product may be a compound which has an unreacted hydroxyl group or an unreacted isocyanate group, and has a urethane bond. Further, this reaction product is preferably selected to have a molecular weight so that it is soluble in the pentafluoropropane.

(g) is preferably a reaction product of the above-mentioned halogen-containing polyether polyol with an isocyanate compound. This reaction product is preferred, since it is excellent in stability in a mixed state with a polyol and a blowing agent.

The isocyanate compound may be an aromatic, alicyclic or aliphatic polyisocyanate having at least one isocyanate group, preferably at least two isocyanate groups, a mixture of two or more such polyisocyanates, or a modified polyisocyanate obtainable by modifying such a polyisocyanate or a mixture.

For example, preferred is a polyisocyanate such as tolylene diisocyanate (TDI), diphenylmethane diisocyanate (MDI), polymethylenepolyphenyl isocyanate, xylylene diisocyanate, isophorone diisocyanate or hexamethylene diisocyanate, or a prepolymer type modified product, a nurate modified product or a urea modified product thereof.

The composition of the present invention is useful for a wide range of applications such as a solvent, an aerosol propellant, a refrigerant and a blowing agent. Among them, it is particularly suitable for a blowing agent for preparation of a plastic foam, particularly a blowing agent for preparation of a polyurethane foam. When the composition of the present invention is used as a polyurethane blowing agent, the composition may contain a polyol component or an isocyanate component.

In the composition of the present invention, the content of "(i) a combination of (a) and at least member selected from (b) to (e)" or "(ii) at least one member selected from (f) and (g)" is from 0.001 to 10 parts by weight per 100 parts by weight of the pentafluoropropane, preferably from 0.01 to 10 parts by weight per 100 parts by weight of the pentafluoropropane.

"(i) a combination of (a) and at least one member selected from (b) to (e)" and "(ii) at least one member selected from (f) and (g)" may be used in combination.

In (i), the proportions of (a) and at least one member selected from (b) to (e) are preferably such that the former is from 0.01 to 100 parts by weight and the latter is 1 part by weight.

Further, in the application as a polyurethane blowing agent, when (f) is a halogen-containing polyether polyol, such a polyether polyol usually constitutes a part of a polyol component. Likewise, when (g) is a reaction product of a halogen-containing polyether polyol with an isocyanate compound and has a hydroxyl group, such a reaction product usually constitutes a part of a polyol component.

Further, when (g) is a reaction product of a halogen-containing polyether polyol with an isocyanate compound and has an isocyanate group, such a reaction product usually constitutes a part of an isocyanate component.

The composition of the present invention may further contain other stabilizer, for example, at least one member selected from a compound having —$COR^3$ wherein $R^3$ is an alkyl group, a halogenated alkyl group, an aryl group or a halogenated aryl group, a compound having —$CO_2R^4$ wherein $R^4$ is a residue having a hydroxyl group removed from an alcohol or a halogenated alcohol, a halogenated aromatic hydrocarbon having a halogen atom directly bonded to a carbon atom of the aromatic ring, a phenol, an unsaturated group-containing aromatic compound, a metallocene, a metal acetyl acetonate, an oxime, an epoxy compound, an organic acid, an ammonium salt or amine salt of an organic acid, a halogenated alkane and a halogenated alcohol, in an amount of from 0.001 to 10 parts by weight, preferably from 0.01 to 10 parts by weight, per 100 parts by weight of the pentafluoropropane.

The compound having $COR^3$ wherein $R^3$ is an alkyl group, a halogenated alkyl group, an aryl group or a halogenated aryl group, may, for example, be an aliphatic monoketone such as methyl ethyl ketone or methyl isobutyl ketone, a phenone such as acetophenone, p-methylacetophenone, n-butyrophenone or benzophenone, or a β-diketone such as benzoylacetone, α'-benzoyl-α,α,α-trifluoroacetone, dibenzoylmethane, furoylacetone, acetylacetone or (trifluoroacetyl)acetone. Particularly preferred is an aliphatic monoketone or a phenone.

$R^3$ which is a halogenated alkyl group or a halogenated aryl group, is preferably an alkyl group or an aryl group, wherein at least a part of hydrogen atoms in the alkyl group or the aryl group is substituted by a halogen atom such as a fluorine atom or a chlorine atom. The carbon number of the alkyl group or the halogenated alkyl group is preferably from 1 to 5.

The compound having —$CO_2R^4$ wherein $R^4$ is a residue having a hydroxyl group removed from an alcohol or a halogenated alcohol, may, for example, be an ester of an aliphatic carboxylic acid, such as ethyl acetate, butyl acetate, amyl acetate, ethyl formate, 2,2,2-trichloroethyl formate, butyl butyrate, amyl butyrate, methyl propionate, ethyl propionate, butyl propionate, amyl propionate, butyl acrylate, butyl methacrylate, methyl stearate, ethyl stearate, butyl stearate, butyl oleate, ethyl laurate, dimethyl oxalate, dibutyl malonate, diethyl succinate, dibutyl tartarate, methyl maleate, ethyl maleate, chloroethyl acetate, chloropropyl acetate, methyl laurate, ethyl laurate, methyl 3-oxobutanoate, ethyl 3-oxobutanoate, methyl acetoacetate, ethyl acetoacetate, ethyl 3-oxopentanoate or ethyl 3-oxooctadecanoate, or an ester of an aromatic carboxylic acid, such as ethyl benzoate, ethyl 4-methylbenzoate, dimethyl phthalate, chloroethyl benzoate or chloropropyl benzoate.

Other esters may, for example, be esters of aliphatic carboxylic acids or aromatic carboxylic acids with halogen-containing polyether polyols having a halogenated alkyl group. Such esters are preferred, since they are excellent in stability in a mixed state of a polyol and a blowing agent. Such halogen-containing polyether polyols may be the same as described above with respect to (g) or (f).

$R^4$ which is a residue having a hydroxyl group removed from a halogenated alcohol, may, for example, be a residue having a hydroxyl group removed from a usual halogenated alcohol having a halogenated alkyl group, or a residue having a hydroxyl group removed from the above-mentioned halogen-containing polyether polyol.

The halogenated alkyl group in the halogenated alcohol or the halogenated alkyl group in the halogen-containing polyether polyol, is preferably an alkyl group, wherein at least a part of hydrogen atoms in the alkyl group is substituted by a halogen atom such as a fluorine atom or a chlorine atom. As the active hydrogen compound, the same active hydrogen compound as described above may be employed.

The halogenated aromatic hydrocarbon having a halogen atom directly bonded to a carbon atom of the aromatic ring, may, for example, be p-fluorotoluene. The halogen atom is preferably a halogen atom selected from a fluorine atom, a chlorine atom and a bromine atom.

The phenol may be the same as the phenol in the above-described (f).

The unsaturated group-containing aromatic compound may, for example, be styrene, vinyltoluene, α-methylstyrene, p-isopropenyltoluene, o-isopropenyltoluene, p-isopropenyl-o-xylene, p-isopropenyl-α-ethylstyrene, methoxystyrene or ethoxystyrene.

The metallocene may, for example, be ferrocene, nickelocene, cobaltocene, molybdocene dichloride, dicyclopentadienyltitanium dichloride or dicyclopentadienylzirconium dichloride.

The metal acetyl acetonate may, for example, be copper acetyl acetonate, iron acetyl acetonate, manganese (II) acetyl acetonate or cobalt (II) acetyl acetonate.

The oxime may, for example, be acetoaldoxime, cyclohexanoneoxime, benzaldoxime or acetoxime.

The epoxy compound may, for example, be a monoepoxy compound such as ethylene oxide, 1,2-butylene oxide, propylene oxide, styrene oxide, cyclohexene oxide, glycidol, epichlorohydrin, phenyl glycidyl ether, glycidyl methacrylate, allyl glycidyl ether, methyl glycidyl ether, butyl glycidyl ether or 2-ethylhexyl glycidyl ether, or a polyepoxy compound such as diepoxybutane, vinylcyclohexene dioxide, neopentyl glycol diglycidyl ether, ethylene glycol diglycidyl ether, glycerol polyglycidyl ether or trimethylolpropane triglycidyl ether.

The organic acid may, for example, be formic acid, acetic acid, propionic acid or lauric acid. The amine used for the ammonium salt or the amine salt of this organic acid, may, for example, be dimethylamine, diethylamine, trimethylamine or triethylamine.

The halogenated alkane may, for example, be chloroethane, 1-chloropropane, 2-chloropropane, 1-chlorobutane, 2-chlorobutane, bromomethane, dibromomethane, bromoform, carbon tetrabromide, bromoethane, 1-bromopropane, 2-bromopropane, 1-bromobutane, 2-bromobutane, 1,2-dibromobutane, 1,3-dibromobutane, 1,4-dibromobutane, 2,3-dibromobutane, iodoethane, 1-iodopropane, 2-iodopropane, 1-iodobutane or 2-iodobutane.

The halogenated alcohol may, for example, be 2-chloroethanol, 2,2-dichloroethanol, 2,2,2-trichloroethanol, 1-chloro-2-propanol, 2-bromoethanol, 2,2- dibromoethanol, 2,2,2-tribromoethanol, ethylenechlorohydrin or propylenebromohydrin.

Now, the present invention will be described in further detail with reference to Examples and Comparative Examples. However, it should be understood that the present invention is by no means restricted by such specific Examples.

EXAMPLES 1 to 23 (the present invention),
EXAMPLES 24 to 28 (Comparative Examples),
EXAMPLES 29 to 36 (the present invention) and
EXAMPLE 37 (Comparative Example)

Tables 2 to 4 and 6 show the results of cases wherein R245fa was used as a polyurethane blowing agent. Table 7 shows the results of cases wherein R245ca was used as a polyurethane blowing agent.

The tests in Examples 1 to 28 were carried out by using test samples prepared by mixing predetermined amounts of the polyol component (P1 liquid) as identified in Table 1, the isocyanate component (I liquid) as identified in Table 1, blowing agent R245fa and various organic compounds as identified in Tables 2 to 4.

Using a wooden box having a size of 200 mm×200 mm ×200 mm, a polyurethane foam was prepared from the above test sample, whereupon its center portion was sampled. The amount of decomposition product R1234ze or R1234ye formed by the heat generation during foaming, was analyzed by gas chromatography, whereby the effect for controlling the decomposition product was determined.

The "added amount" in Tables 2 to 4 means the amounts of the organic compounds in Tables 2 to 4 added to P1 liquid. The blowing agent was preliminarily incorporated to P1 liquid. The "added amount" in Tables 6 and 7 means the amounts of the organic compounds in Tables 6 and 7 added to P2 liquid or I liquid.

In Examples 29, 30, 33 and 34, the organic compounds were preliminarily incorporated to P2 liquid. In Examples 31, 32, 35 and 36, the organic compounds were preliminarily incorporated to B liquid. Further, the blowing agent was preliminarily incorporated to P2 liquid.

In Tables 6 and 7, "OH value" represents a hydroxyl value (unit: mgKOH/g), and in Tables 6 and 7, "NCO content" represents the content of isocyanate groups (unit: wt%).

Further, in Tables 6 and 7, X represents an epichlorohydrin adduct derivative of bisphenol A (OH value: 250), Y represents an epichlorohydrin adduct derivative of glycerol (OH value: 450), DEAM represents diethanolamine, and EPCH represents epichlorohydrin.

In Tables 2 to 4 and 6, A to D in the column for "Decomposition Product" indicate the concentrations (N ppm) of decomposition product R1234ze and have the following meanings.

A: N<50 ppm

B: 50 ppm≦N<100 ppm

C: 100 ppm≦N<500 ppm

D: N≧500 ppm

Further, in Table 7, E and F in the column for "Decomposition Product" indicate the concentrations (M ppm) of decomposition product R1234ye and have the following meanings.

E: M<50 ppm

F: M≧500 ppm

TABLE 1

| P1 liquid | |
|---|---|
| Polyol EL-750ED (manufactured by Asahi Olin K.K. | 100 parts by weight |
| Catalyst Dabco-33LV (manufactured by Sankyo Air Product K.K.) | 2 parts by weight |
| Foam stabilizer SH-193 (manufactured by Toray Silicone K.K.) | 2 parts by weight |
| Pure water | 2 parts by weight |
| I liquid | |
| Isocyanate PAPI-135 (manufactured by Mitsubishi Kasei Dow K.K.) | 150 parts by weight |
| Blowing agent R245fa | 35 parts by weight |

TABLE 2

| Example No. | Organic compound | Added amount (parts by weight) | Decomposition product |
|---|---|---|---|
| 1 | Nitromethane | 1.0 | A |
| | Acetonitrile | 0.5 | |
| 2 | Nitromethane | 1.0 | A |
| | Benzonitrile | 0.5 | |
| 3 | Nitromethane | 1.0 | A |
| | N,N-Dimethylacetamide | 0.5 | |
| 4 | Nitromethane | 1.0 | A |
| | γ-Butyrolactone | 0.5 | |
| 5 | Nitromethane | 1.0 | A |
| | p-Benzoquinone | 0.5 | |
| 6 | Nitroethane | 1.0 | A |
| | Acetonitrile | 0.5 | |
| 7 | Nitroethane | 1.0 | A |
| | Benzonitrile | 0.5 | |
| 8 | Nitroethane | 1.0 | A |
| | N,N-Dimethylacetamide | 0.5 | |
| 9 | Nitroethane | 1.0 | A |
| | γ-Butyrolactone | 0.5 | |
| 10 | Nitroethane | 1.0 | A |
| | p-Benzoquinone | 0.5 | |

TABLE 3

| Example No. | Organic compound | Added amount (parts by weight) | Decomposition product |
|---|---|---|---|
| 11 | p-Nitrotoluene | 1.0 | A |
| | Acetonitrile | 0.5 | |
| 12 | p-Nitrotoluene | 1.0 | A |
| | Benzonitrile | 0.5 | |
| 13 | p-Nitrotoluene | 1.0 | A |
| | N,N-Dimethylacetamide | 0.5 | |
| 14 | p-Nitrotoluene | 1.0 | A |
| | γ-Butyrolactone | 0.5 | |
| 15 | p-Nitrotoluene | 1.0 | A |
| | p-Benzoquinone | 0.5 | |
| 16 | p-Nitrotoluene | 1.0 | A |
| | Acetonitrile | 0.5 | |
| | p-Fluorotoluene | 0.5 | |
| 17 | p-Nitrotoluene | 1.0 | A |
| | N,N-Dimethylacetamide | 0.5 | |
| | p-Fluorotoluene | 0.5 | |
| 18 | p-Nitrotoluene | 1.0 | A |
| | γ-Butyrolactone | 0.5 | |
| | p-Fluorotoluene | 0.5 | |
| 19 | p-Nitrotoluene | 1.0 | A |

TABLE 3-continued

| Example No. | Organic compound | Added amount (parts by weight) | Decomposition product |
|---|---|---|---|
|  | p-Benzoquinone | 0.5 |  |
|  | p-Fluorotoluene | 0.5 |  |

TABLE 4

| Example No. | Organic compound | Added amount (parts by weight) | Decomposition product |
|---|---|---|---|
| 20 | p-Nitrotoluene | 1.0 | A |
|  | Acetonitrile | 0.5 |  |
|  | Chloroethyl acetate | 0.5 |  |
| 21 | p-Nitrotoluene | 1.0 | A |
|  | N,N-Dimethylacetamide | 0.5 |  |
|  | Chloroethyl acetate | 0.5 |  |
| 22 | p-Nitrotoluene | 1.0 | A |
|  | γ-Butyrolactone | 0.5 |  |
|  | Chloroethyl acetate | 0.5 |  |
| 23 | p-Nitrotoluene | 1.0 | A |
|  | p-Benzoquinone | 0.5 |  |
|  | Chloroethyl acetate | 0.5 |  |
| 24 | p-Nitrotoluene | 1.0 | B |
| 25 | p-Nitrotoluene | 0.5 | C |
| 26 | Nitromethane | 1.0 | B |
| 27 | Nitroethane | 1.0 | B |
| 28 | Nil |  | D |

TABLE 5

P2 liquid

| | |
|---|---|
| Polyol having a OH value of 450, having PO and EO added to m—tolylenediamine | 100 parts by weight |
| Polyol having a OH value of 450, having PO and EO added to sucrose | 50 parts by weight |
| Catalyst: Dabco-33LV (manufactured by Sankyo Air Product K.K.) | 2 parts by weight |
| Foam stabilizer: SH-193 (manufactured by Toray Silicone K.K.) | 2 parts by weight |
| Pure water | 2 parts by weight |
| I liquid | |
| Isocyanate: PAPI-135 (manufactured by Mitsubishi Kasei Dow K.K.) | 150 parts by weight |
| Blowing agent | 35 parts by weight |

TABLE 6

| Example No. | Organic compound | Added amount (parts by weight) | Decomposition product |
|---|---|---|---|
| 29 | X (OH value: 250) | 5.0 | A |
| 30 | EPCH adduct derivative of DEAM (OH value: 250) | 5.0 | A |
| 31 | TDI prepolymer of X (NCO content: 15) | 5.0 | A |
| 32 | MDI prepolymer of Y | 5.0 | A |

TABLE 6-continued

| Example No. | Organic compound | Added amount (parts by weight) | Decomposition product |
|---|---|---|---|
|  | (NCO content: 22) |  |  |

TABLE 7

| Example No. | Organic compound | Added amount (parts by weight) | Decomposition product |
|---|---|---|---|
| 33 | X (OH value: 250) | 5.0 | E |
| 34 | EPCH adduct derivative of DEAM (OH value: 250) | 5.0 | E |
| 35 | TDI prepolymer of X (NCO content: 15) | 5.0 | E |
| 36 | MDI prepolymer of Y (NCO content: 22) | 5.0 | E |
| 37 | Nil | — | F |

The composition of the present invention is useful as a blowing agent, an aerosol propellant, a refrigerant or a solvent, and it not only shows an excellent stabilizing effect but also exhibits a remarkable effect for controlling formation of R1234ze or R1234ye.

What is claimed is:

1. A fluorine-containing hydrocarbon composition comprising the following (1) and (2), wherein the proportions of (1) and (2) in the composition are such that (1) is 100 parts by weight, and (2) is from 0.001 to 10 parts by weight:
   (1) at least one pentafluoropropane selected from 1,1,1,3,3-pentafluoropropane and 1,1,2,2,3-pentafluoropropane,
   (2) the following (i) or (ii):
      (i) a combination of (a) and at least one member selected from the following (b) to (e):
         (a) a compound having —$NO_2$,
         (b) a compound having —CN,
         (c) a compound having —$CONR^1R^2$ wherein each of $R^1$ and $R^2$ which are independent of each other, is a hydrogen atom or an alkyl group,
         (d) a lactone,
         (e) a quinone,
      (ii) at least one member selected from the following (f) and (g):
         (f) a reaction product of a compound having a halogen atom and an epoxy group with an active hydrogen compound,
         (g) a reaction product of a compound having a halogen atom and a hydroxyl group with an isocyanate compound.

2. The composition according to claim 1, wherein the proportions of (a) and at least one member selected from (b) to (e) in (i) are such that the former is from 0.01 to 100 parts by weight, and the latter is 1 part by weight.

3. The composition according to claim 1, wherein the fluorine-containing hydrocarbon composition is a blowing agent for preparation of a plastic foam.

4. The composition according to claim 1, wherein (a) is a nitroalkane or an aromatic nitro compound.

5. The composition according to claim 1, wherein (b) is an aliphatic nitrile or an aromatic nitrile.

6. The composition according to claim 1, wherein (c) is a formamide or an acetamide.

7. The composition according to claim 1, wherein (d) is β-lactone, γ-lactone or δ-lactone.

8. The composition according to claim 1, wherein (e) is p-benzoquinone, o-benzoquinone, 9,10-anthraquinone or 1,4-naphthoquinone.

9. The composition according to claim 1, wherein (f) is a halogen-containing polyether polyol.

10. The composition according to claim 1, wherein the compound having a halogen atom and an epoxy group in (f) is an aliphatic hydrocarbon having a halogen atom and an epoxy group.

11. The composition according to claim 10, wherein the aliphatic hydrocarbon having a halogen atom and an epoxy group is epichlorohydrin.

12. The composition according to claim 1, wherein the active hydrogen compound in (f) is a monool, a polyol, a phenol, a compound having a primary amino group, a compound having a secondary amino group, or a compound having a carboxyl group.

13. The composition according to claim 1, wherein (g) is a reaction product of (f) with an isocyanate compound.

14. The composition according to claim 13, wherein (f) is a halogen-containing polyether polyol.

15. The composition according to claim 14, wherein the halogen-containing polyether polyol is a reaction product of an aliphatic hydrocarbon having a halogen atom and an epoxy group with an active hydrogen compound.

16. The composition according to claim 15, wherein the aliphatic hydrocarbon having a halogen atom and an epoxy group is epichlorohydrin.

17. The composition according to claim 15, wherein the active hydrogen compound is a monool, a polyol, a phenol, a compound having a primary amino group, a compound having a secondary amino group or a compound having a carboxyl group.

18. The composition according to claim 1, wherein the isocyanate compound in (g) is an aromatic, alicyclic or aliphatic polyisocyanate.

* * * * *